United States Patent [19]

Kurosawa et al.

[11] 3,813,483

[45] May 28, 1974

[54] FACSIMILE SYSTEM

[75] Inventors: Koichi Kurosawa; Ko Okubo, both of Tokyo, Japan

[73] Assignee: Anritsu Electric Co., Ltd., Tokyo, Japan

[22] Filed: June 1, 1972

[21] Appl. No.: 258,789

[52] U.S. Cl. .......... 178/6, 178/DIG. 3, 178/DIG. 23, 179/15 BC, 325/60

[51] Int. Cl. ........ H04j 1/20, H041 5/12, H04n 1/02

[58] Field of Search ............ 178/DIG. 3, DIG. 23, 6; 179/15 BC; 325/60

[56] References Cited

UNITED STATES PATENTS

| | | | |
|---|---|---|---|
| 2,995,618 | 8/1961 | Van Duuren et al. | 178/66 A |
| 3,134,855 | 5/1964 | Chasek | 325/60 |
| 3,311,442 | 3/1967 | De Jager et al. | 325/60 |
| 3,423,529 | 1/1969 | O'Neill, Jr. | 178/68 |
| 3,475,555 | 10/1969 | McMann, Jr. | 325/60 |
| 3,518,680 | 6/1970 | McAuliffe | 325/60 |
| 3,619,501 | 11/1971 | Nussbaumer | 325/60 |
| 3,706,842 | 12/1972 | Robertson | 178/6 |

*Primary Examiner*—Benedict V. Safourek
*Assistant Examiner*—Michael A. Masinick
*Attorney, Agent, or Firm*—Flynn & Frishauf

[57] ABSTRACT

A facsimile system comprising a signal transmitting section comprising two scanners for scanning the surface of an original picture in parallel directions, a multiplex modulator for forming a composite picture signal by subjecting two carrier waves shifted 90 in phase from each other to 2-phase modulation by the picture signals obtained from said scanners; and a signal receiving section comprising a multiplex demodulator for subjecting said composite picture signal to 2-phase demodulation so as to separate it into two original picture signals and two recorders for reproducing the original picture upon receipt of the aforesaid two picture signals.

4 Claims, 7 Drawing Figures

FACSIMILE SYSTEM

BACKGROUND OF THE INVENTION

This invention relates to a facsimile system and more particularly to a facsimile system permitting high speed transmission.

Facsimile systems have been recently widely accepted in remote transmission of writings or drawings. However, the prior art facsimile system has the noticeable disadvantage that transmission is effected at a considerably low speed. Where it is attempted to elevate the transmission speed of the conventional facsimile system merely using an amplitude modulation means, said attempt has to be made at the sacrifice of the resolution capacity of such system within the prescribed range of band width. To date, there have been proposed many other methods to attain high speed transmission. However, the apparatus therefor tends to be extremely complicated and bulky. Further, these methods use a full binary transmission system and are encountered with the drawbacks that they have a smaller resolution capacity or present a more indistinct transmitted picture less truthful to an original picture than those merely using an amplitude modulation means, and that there are imposed limitations on the characters of original picture being transmitted.

It is accordingly the object of this invention to provide a facsimile system capable of high speed transmission without losing its resolution capacity or the fidelity of a transmitted picture to an original picture as well as the clearness of said picture.

SUMMARY OF THE INVENTION

According to this invention, an original picture is scanned on the transmission side by two scanners in parallel directions and two picture signals are derived at the same time. Said two picture signals are supplied to a 2-phase modulator, so as to effect the amplitude modulation of separately generated two carrier waves having the same frequency but shifted 90° in phase from each other. The resultant two modulated signals are combined by a mixer to be transmitted in the form of a composite picture signal. On the receiving side, said composite picture signal is separated into two original picture signals by a multiplex demodulator. The two separated picture signals are supplied to two recorders on the receiving side which carry out scanning in synchronization with the transmission side scanners, thereby reproducing a single picture on a picture pickup surface.

A facsimile system arranged as described above according to this invention enables high speed transmission with a simple construction without losing its resolution capacity.

DETAILED DESCRIPTION OF THE INVENTION

There will now be described by reference to the appended drawings facsimile systems according to the first to the fourth embodiments.

First Embodiment

Figure 1:
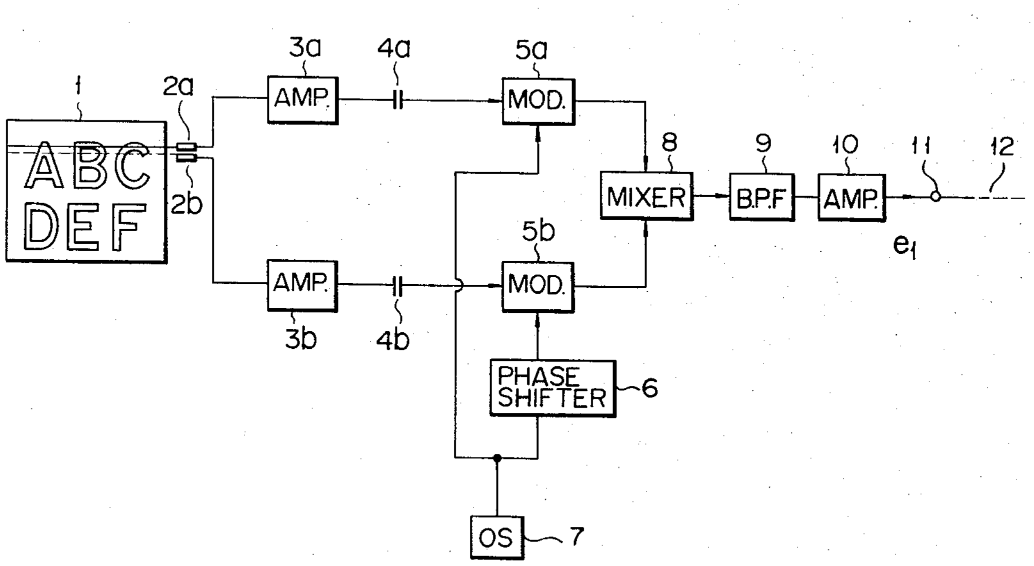
FIG. 1 is a block circuit diagram of the transmission section of a facsimile system according to a first embodiment of this invention.

Referring to FIG. 1, there are arranged two scanners *2a* and *2b* in parallel at a sufficient separation to attain a maximum resolution capacity so as to scan the surface of an original picture being transmitted in parallel directions at the same time, thereby delivering two separate picture signals. Output signals from said scanners *2a* and *2b* are amplified by amplifiers *3a* and *3b*. After being stripped of a D.C. component in capacitors *4a* and *4b*, the picture signals thus amplified are supplied to modulators *5a* and *5b*. The picture signal introduced into the modulator *5a* amplitude modulates a carrier wave generated by an oscillator 7 and the picture signal brought into the modulator *5b* amplitude modulates a carrier wave generated by the oscillator 7 and shifted 90° in phase from the first mentioned carrier wave by a phase shifter 6, obtaining two modulated signals. The modulators *5a* and *5b* generally consist of ring modulators. In this case, the carrier waves are not fully suppressed, but are made to leak at the same level. Where there is not generated any picture signal, there is delivered a carrier wave having a certain level. Said leak carrier wave is used in the receiving section to reproduce a carrier wave corresponding to a transmission carrier wave. Thus from the modulators *5a* and *5b* are obtained two modulated signals bearing carrier wave shifted 90° in phase from each other. These modulated signals are composed into one by a mixer. The resultant composite signal is made to pass through a band pass filter to eliminate unnecessary signals produced during said modulation and properly amplified by an amplifier 10 and thereafter delivered into a line 12 for transmission through an output terminal 11.

Now let it be assumed that the modulators 5a and 5b are supplied with picture signals cos $\omega$at and cos $\omega$bt and carrier signals cos $\omega ct$ and sin $\omega ct$. Then a composite signal $e_1$ delivered to a transmission line will be formed as follows:

$$e_1 = \text{K}\cos \omega ct + \cos(\omega c + \omega a)\, t \cos(\omega c - \omega a)\, t + \text{K}\sin \omega ct + \sin(\omega c + \omega b)\, t + \sin\, (\omega c - \omega b)\, t \qquad (1)$$

A composite signal of the above equation (1) is known as a 2-phase modulated wave, and is used to reproduce an original picture after being separated into two picture signals. Said 2-phase modulated wave which is composed from two amplitude modulated waves has the same side band width as that of a single amplitude modulated wave. Therefore, the above-mentioned 2-phase modulation process enables twice as much information as that possible with the customary single phase modulation system to be transmitted even with the same band width as that of the singals used in the latter system.

Figure 2:
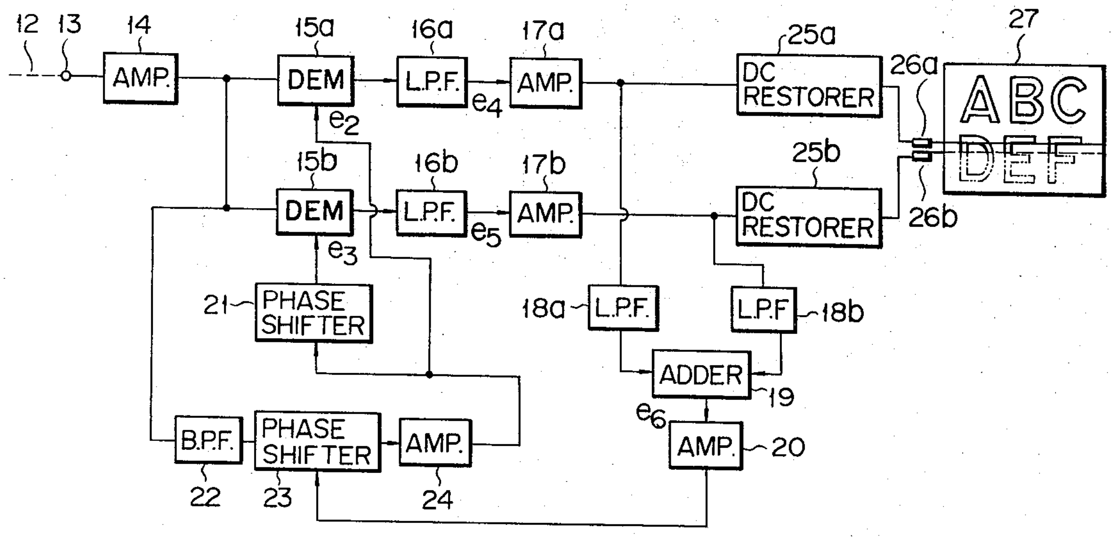
FIG. 2 is a block circuit diagram of the receiving section of the same.
Figure 3:
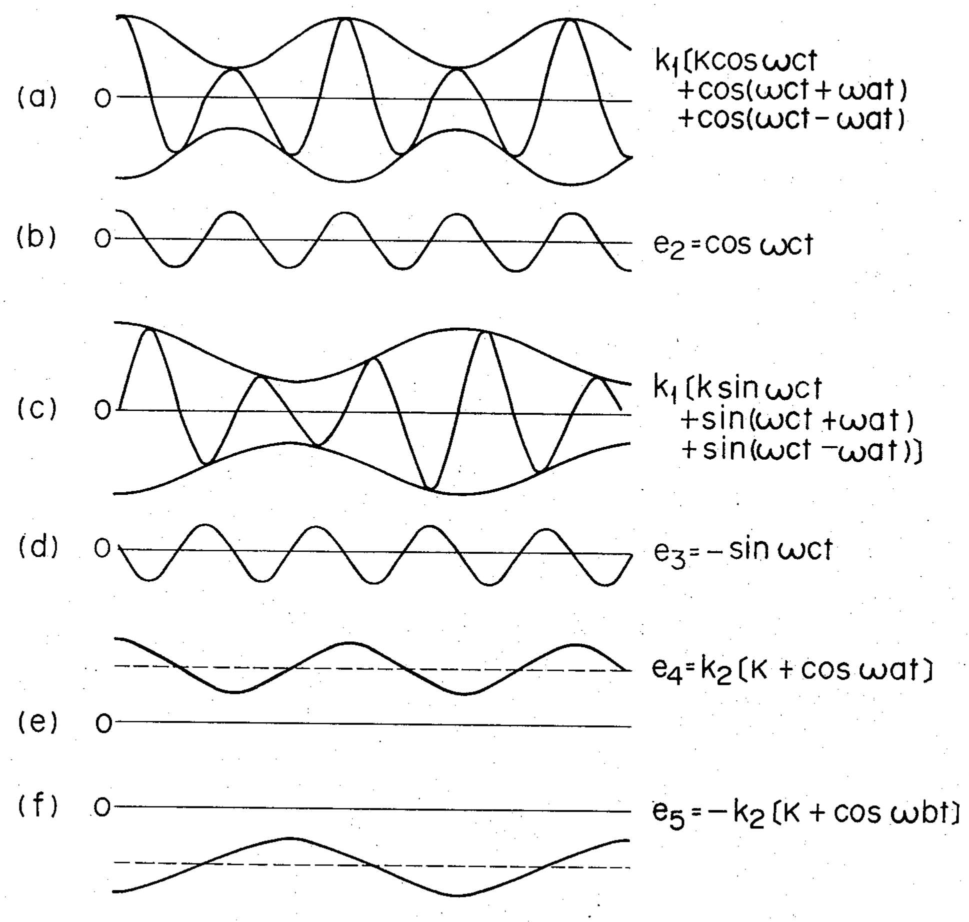
FIG. 3 represents the wave forms appearing at the various parts of the receiving section.

The 2-phase modulated signal delivered from the transmission section of FIG. 1 is conducted to the receiving input terminal 13 of FIG. 2 and properly amplified by an amplifier 14 and then transferred to demodulators 15a and 15b and band pass filter 22. This band pass filter 22 has narrow band characteristics and is used to draw off a carrier component from the signal received. The carrier component drawn off by said band pass filter 22 has its phase shifted as later described by a voltage controlled type phase shifter 23 and is amplified by an amplifier 24. An output signal from said amplifier 24 is supplied to the demodulator 15*a* as a demodulation carrier wave, and, after having its phase shifted 90°, is conducted to the demodulator 15*b* as a demodulation carrier.

Where a transmission circuit is supposed to have ideal phase and amplitude characteristics, then there will be produced an amplified signal expressed in the equation (1) above at the output terminal of the amplifier 14. The sine and cosine components of said amplified output signal are indicated by the wave forms (*c*) and (*a*) of FIG. 3. If, under such condition, the demodulator 15*a* is supplied with a demodulation carrier having a wave form shown in FIG. *3b* and the demodulator 15*b* with a demodulation carrier having a wave form shown in FIG. *3d*, then the cosine component of the received signal will be demodulated by a carrier wave $e_2$ and filtered by a low pass filter 16*a* to be produced at its output terminal in the form of a signal $e_4$ having a wave form shown in FIG. *3e*. The sine component of the received signal will be demodulated by a carrier wave $e_3$ and filtered by a low pass filter 16*b* to be produced at its output terminal in the form of a signal $e_5$ having a wave form shown in FIG. *3f*. The D.C. components of the aforesaid output signals $e_4$ and $e_5$ resulted from the demodulation of the leak carrier component supplied from the transmission section. To maintain the demodulation carrier waves $e_2$ and $e_3$ for the demodulators 15a and 15b in the condition of FIG. 3, that is, $e_2 = \cos \omega ct$ and $e_3 = -\sin \omega ct$, signals $e_4$ and $e_5$ are amplified by amplifiers 17*a* and 17*b* as much as the aforesaid carrier waves $e_2$ and $e_3$ to have the D.C. components of the signals $e_4$ and $e_5$ drawn off through low-pass filters 18*a* and 18*b*. The D.C. components derived from the filters 18*a* and 18*b* are supplied to an adder 19 to be added together. The aforementioned voltage controlled phase shifter 23 is so controlled as to reduce an output voltage $e_6$ from said adder 19 substantially to zero. The condition in which said voltage $e_6$ is reduced to zero is attained when the signals $e_4$ and $e_5$ have an equal absolute value, that is, when a composite picture signal is properly separated and demodulated by the demodulators 15*a* and 15*b*. D.C. components cut out by the capacitors 4*a* and 4*b* of the transmission section of FIG. 1 and thereafter restored by D.C. restorers 25*a* and 25*b* are added to output signals from the amplifiers 17*a* and 17*b* in said restorers 25*a* and 25*b*. Output signals from said restorers 25*a* and 25*b* are so conducted as to match the scanners 2*a* and 2*b* of the transmission section and supplied to recorders 26*a* and 26*b* to scan the surface of a recording sheet of paper so as to reproduce an original picture thereon.

Second Embodiment

A facsimile system according to the second embodiment has the same transmission section as that of the first embodiment shown in FIG. 1. However, the receiving section of this second embodiment is slightly different from that of FIG. 2 in respect of the extraction of carrier waves and the control of phases. According to the second embodiment, received signals are subjected to frequency conversion to have the carrier component extracted through a band pass filter. Said extracted carrier component is converted to its original frequency.

Figure 4:
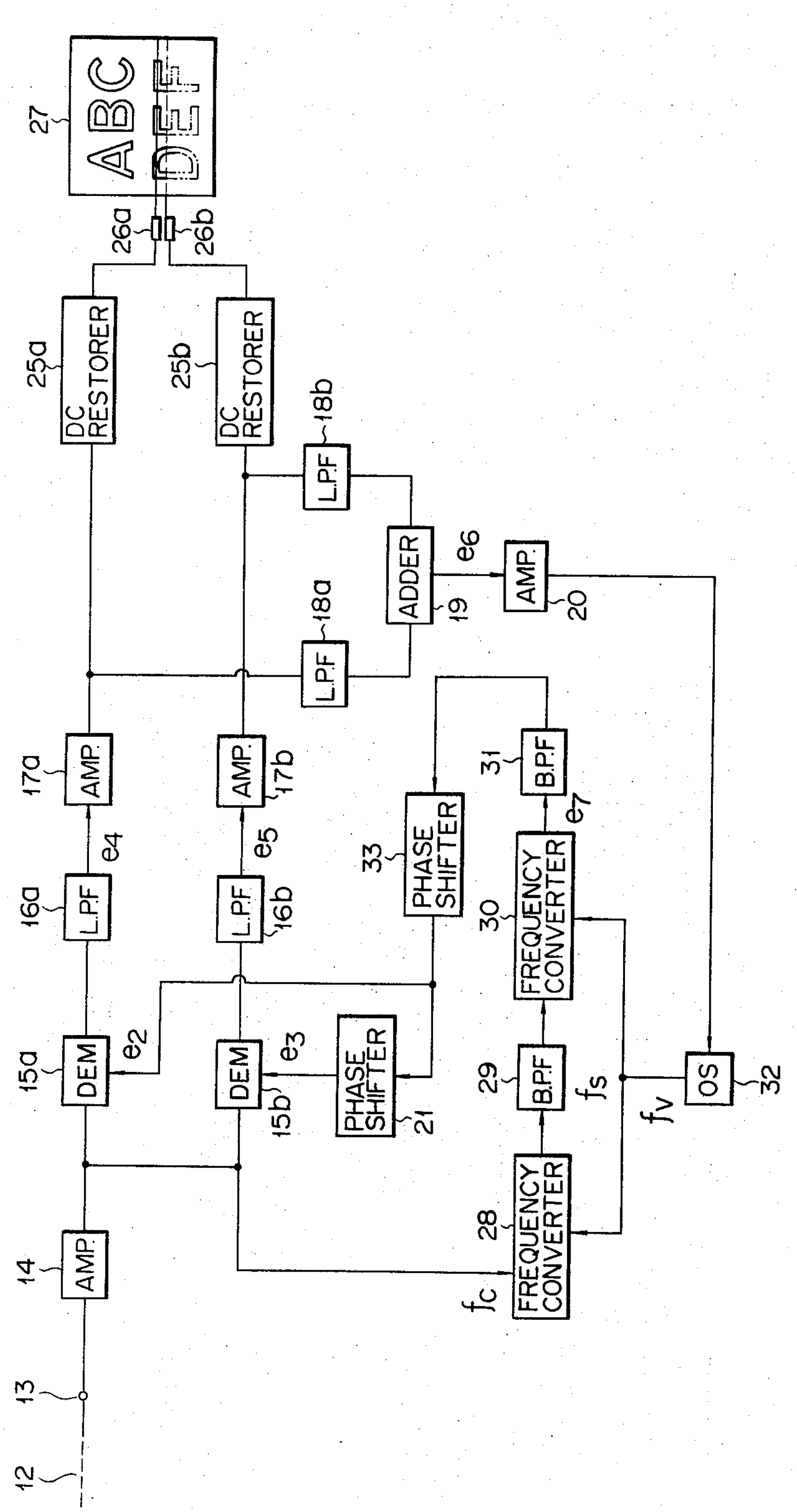
FIG. 4 is a block circuit diagram of the receiving section of a facsimile system according to a second embodiment of the invention.

There will now be further detailed the second embodiment by reference to FIG. 4. A received signal is supplied to the demodulators 15*a*, 15*b* and a frequency converter 28 through the amplifier 14. The frequency converter 28 is supplied with an output from a voltage controlled oscillator 32. Now let the frequency of a carrier wave be designated as fc and the central frequency of a band pass filter 29 as *fs*. Then for extraction of the carrier component through the band pass filter 29, it is necessary that the voltage controlled oscillator 32 should have its voltage so controlled as to generate an oscillation frequency fv whose frequency is constituted by $fs+fc$. The carrier component is conducted to a frequency converter 30 already supplied with an output from the oscillator 32 and frequency converted to a signal $e_7$ formed as shown in the equation (2) below:

$$e_7 = fs \pm fv = fs \pm (fs + fc) \quad (2)$$

A s seen from this equation, the signal $e_7$ is produced at the output terminal of the converter 30 with a frequency of $2fs + fc$ as well as with a frequency of *fc*. However, said fc frequency component is extracted by a band pass filter 31, subjected to a prescribed phase shifting and supplied to the demodulator 15*a* and, after having its phase shifted 90° by the phase shifter 21, conducted to the demodulator 15*b*.

In a facsimile system according to the embodiment of FIG. 4, the voltage controlled oscillator 32 in the receiving section has its voltage so controlled as to reduce, as previously described, an output voltage $e_6$ from the adder 19 substantially to zero, bringing the entire facsimile system to a balanced state. A phase shifter 33 has such a desired phase shift value that where the facsimile system is brought to a balanced state, the carrier wave can be extracted by the central frequency of the band pass filter 29. This will be further detailed. Where there is obtained the same ideal transmission line as described in connection with the first embodiment, then there is produced at the output terminal of the amplifier 14 a signal having such a form as shown in the aforementioned equation (1). If, in the second embodiment of FIG. 4, demodulation carrier waves supplied to the demodulators 15*a* and 15*b* have wave forms of $\cos \omega ct$ and $-\sin \omega ct$ respectively, then there will be drawn off two picture signals from said demodulators 15*a* and 15*b*. Accordingly, where the carrier component is extracted through the band pass filter 29 by its central frequency, the phase shifter 33 will have a sufficient value to cause a carrier wave for the demodulator 15*a* to have a wave form of $\cos \omega ct$.

There will now be discussed the case where the transmission circuit is not in an ideal state, leading to occurrence of synchronization errors. Now let it be assumed that a synchronization error of $+\Delta f$ has taken place in the transmission circuit and that, up to this point, the band pass filter 29 extracted a carrier component by its central frequency of fs. Due to the occurrence of the above-mentioned synchronization error, however, the input terminal of the band pass filter 29 is now supplied with a carrier component having a frequency changed to $fs+\Delta f$. Therefore, demodulation carrier waves being supplied to the demodulators 15a and 15b cease to have wave forms of cos $\omega ct$ and $-$sin $\omega ct$. This leads to changes in the D.C. component of outputs from the demodulators 15a and 15b, generation of a voltage $e_6$ from the adder 19 and consequently changes in an output voltage from the amplifier 20. The voltage controlled oscillator 32 has its voltage so controlled by said changed output voltage from the amplifier 20 as to cause a carrier component to be supplied to the band pass filter 29 with a frequency approaching its central frequency $fs$. Finally, said voltage controlled oscillator 32 will have its oscillation frequency settled to a frequency of $fs+fc+\Delta f$. Thus the facsimile system of the second embodiment enables an output voltage $e_6$ from the adder 19 to be reduced to zero.

As mentioned above, the band pass filter 29 is supplied with a carrier component whose frequency is automatically controlled to approach its central frequency, so that even where there occur synchronization errors in the transmission circuit, the side band components neared the carrier are always attenuated to a fixed extent, rendering the second embodiment more adapted to cope with synchronization errors than the first embodiment.

Third Embodiment

Figure 7:
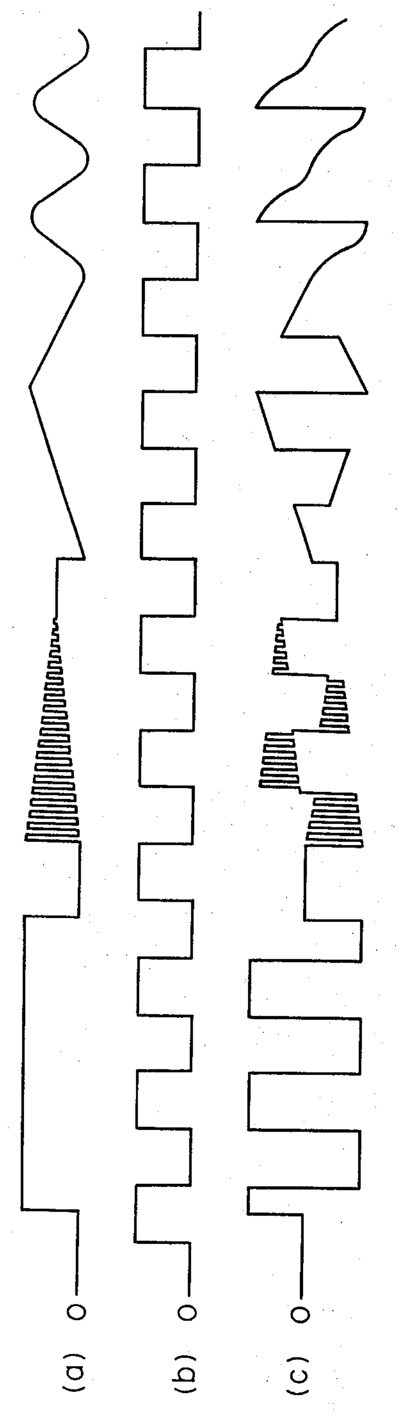
FIG. 7 indicates wave forms illustrating the operation of the facsimile system of FIGS. 5 and 6.
Figure 6:
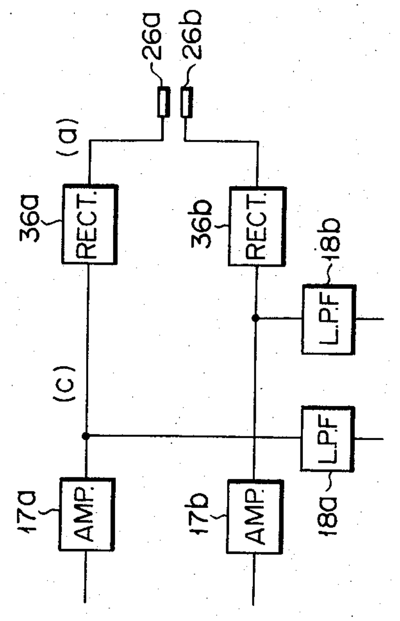
FIG. 6 is a fractional block circuit diagram of the receiving section of a facsimile system according to a third and a fourth embodiment of the invention.
Figure 5:
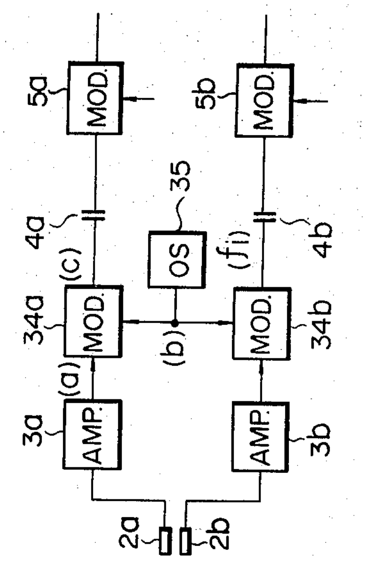
FIG. 5 is a fractional block circuit diagram of the transmission section of a facsimile system according to a third and a forth embodiment of the invention.

A facsimile embodiment according to the third embodiment is more improved in the transmission section than the preceding two embodiments. As shown in FIG. 5, there are provided modulators 34a and 34b between the amplifier 3a and capacitor 4a and between the amplifier 3b and capacitor 4b respectively. The D.C. restorers 25a and 25b of the receiving section shown in FIG. 2 are replaced by full wave rectifiers 36a and 36b shown in FIG. 6. There will now be described the operation of the third embodiment. Where there is produced an picture signal having a wave form shown in FIG. 7a at the output terminal of the amplifier 3a, said picture signal modulates the amplitude of a modulation carrier wave supplied from an oscillator 35 in a modulator 34a. Said modulation carrier wave is chosen to have a frequency far lower than the maximum picture frequency. For example, where the picture signal has a maximum frequency of 5 KHz, then said modulation carrier wave has its frequency set at about 100 Hz. FIG. 7b shows the wave form of the modulation carrier wave. The modulators 34a and 34b are designed to carry out 100 percent modulation. From the output terminals of the modulators 34a and 34b is obtained a signal having a wave form shown in FIG. 7c. This output signal is transmitted through the capacitors 4a and 4b and the succeeding circuit arrangement shown in FIG. 1. The picture signal thus transmitted is amplified by the amplifier 17 of the receiving section of FIG. 6 and subjected to full wave rectification by full wave rectifiers 36a and 36b to be converted to the wave form of FIG. 7a, and conducted to the recorders 26a and 26b for reproduction of an original picture.

The transmission section of the aforementioned facsimile system of the third embodiment is formed by adding modulators to that of the first embodiment so as to modulate a carrier wave having a far lower frequency than the picture signal, and the receiving section of the third embodiment is provided with full wave rectifiers to reproduce an original picture by subjecting the modulated signal to full wave rectification. The above-mentioned modulation of a low frequency carrier wave by the picture signal reduces the D.C. component and low frequency component of the picture signal. If there is transmitted an picture signal containing large amounts of the D.C. and low frequency components by a facsimile system according to the first or second embodiment, then the receiving section will present difficulties in extracting carrier wave alone. However, the third embodiment minimizes such disadvantage.

Fourth Embodiment

A facsimile system according to the fourth embodiment has the same transmission section as that of the third embodiment. However, the receiving section of the fourth embodiment is formed by replacing the D.C. restorers 25a and 25b of the receiving section of the second embodiment with full wave rectifiers. In this transmission section of the fourth embodiment, low frequency carrier waves are subjected to amplitude modulation, obtaining modulated signals. Said modulated signals are transmitted after 2-phase modulation. In the receiving section of the fourth embodiment, picture signals received are subjected to 2-phase demodulation and full wave rectification and conducted to the recorders. The facsimile system of the fourth embodiment combines the characteristics of the second embodiment with those of the third, thereby minimizing the effect of synchronization errors in the transmission circuit on the extracted carrier wave and reducing limitations on the type of original picture being transmitted.

What we claim is:

1. A facsimile system comprising:

a transmission section including two scanners for scanning the surface of an original picture being transmitted in parallel and in interleaved relation with each other and for detecting two respective picture signals; a modulation carrier generator for generating two modulation carriers having the same frequency but having a phase difference of 90 degrees from each other; two modulators respectively coupled to said two scanners and said carrier generator to modulate the two carriers respectively by the two picture signals; and a mixer coupled to said modulators to mix the modulated signals from said two modulators thereby obtaining a composite picture signal to be transmitted; and a receiving section including a receiving end for receiving the composite picture signal from said transmission section; a demodulation carrier generator coupled to said receiving end to generate two demodulation carriers corresponding to the modulation carriers of said transmission section generated on the basis of the carrier component including in the composite picture signal; two demodulators coupled to said demodulation carrier generator to demodulate the composite picture signal by the two demodulation carriers thereby to separate the composite picture signal into two picture signals; D.C. reproducing means coupled to said two demodulators to reproduce the D.C. components included in the original picture signals; and two recorders coupled to said D.C. reproducing means to scan the surface of a sheet of a recording medium in parallel corresponding to the scanning of the two scanners of the transmission section and reproduce the original picture on said recording medium on the basis of the two separated picture signals;

said demodulation carrier generator including a D.C. unbalance detector coupled to said two demodulators to detect an unbalance between two D.C. components respectively included in two demodulated picture signals; an oscillator coupled to said D.C. unbalance detector, the oscillation frequency of said oscillator being varied by the output voltage of said detector; a first frequency converter coupled to said oscillator and to said receiving end to frequency convert the carrier of the received composite picture signal by means of the output frequency of said oscillator; a first band pass filter coupled to said first frequency converter to pass a predetermined frequency of the frequency converted carrier; a second frequency converter coupled to said oscillator and to the output of said first band-pass filter to frequency convert the predetermined frequency passed through said first band-pass filter by means of the frequency of said oscillator back to the original carrier frequency; a second band-pass filter coupled to said second frequency converter to filter the carrier from the output of said second converter; a first phase shifter coupled to said second band-pass filter to shift the filtered carrier from said second band-pass filter so as to coincide the phase of the filtered carrier with that of the carrier at the receiving end and coupled to one of said demodulators to supply the carrier therethrough as a demodulation carrier; and a second phase shifter coupled between said first phase shifter and the other of said demodulators to further shift the carrier by 90° and then supply the 90° further shifted carrier to said other demodulator.

2. The facsimile system according to claim 1 wherein said modulation carrier generator comprises an oscillator of which the output is coupled to one of said modulators, and a phase shifter coupled to the output of said oscillator to shift 90° in phase the output signal from said oscillator.

3. The facsimile system according to claim 1 wherein said transmission section further includes two additional modulators each coupled between one of said scanners and one of said modulators to modulate the carrier having a frequency lower than the maximum picture frequency.

4. The facsimile system according to claim 1 wherein said D.C. reproducing means includes respective full wave rectifying means, each of said rectifying means being coupled between one of said demodulators and its respective recorder.

* * * * *